(12) United States Patent
Biles et al.

(10) Patent No.: US 7,343,482 B2
(45) Date of Patent: Mar. 11, 2008

(54) PROGRAM SUBGRAPH IDENTIFICATION

(75) Inventors: Stuart David Biles, Cambridge (GB); Krisztian Flautner, Cambridge (GB); Scott Mahlke, Ann Arbor, MI (US); Nathan Clark, Ann Arbor, MI (US)

(73) Assignees: ARM Limited, Cambridge (GB); University of Michigan, Ann Arbor, MI (US)

( * ) Notice: Subject to any disclaimer, the term of this patent is extended or adjusted under 35 U.S.C. 154(b) by 98 days.

(21) Appl. No.: 11/048,663

(22) Filed: Jan. 31, 2005

(65) Prior Publication Data

US 2006/0095722 A1    May 4, 2006

Related U.S. Application Data

(60) Provisional application No. 60/619,949, filed on Oct. 20, 2004.

(51) Int. Cl.
 G06F 9/00 (2006.01)
(52) U.S. Cl. ...................................... 712/242
(58) Field of Classification Search ............... 712/242, 712/15, 239
See application file for complete search history.

(56) References Cited

U.S. PATENT DOCUMENTS

| | | | |
|---|---|---|---|
| 4,809,159 A | 2/1989 | Sowa | |
| 5,159,665 A * | 10/1992 | Priem et al. ................. | 345/627 |
| 5,249,274 A | 9/1993 | Sztipanovits et al. | |
| 5,519,841 A | 5/1996 | Sager et al. | |
| 5,685,005 A | 11/1997 | Garde et al. | |
| 5,752,035 A * | 5/1998 | Trimberger ................. | 717/153 |
| 5,784,602 A | 7/1998 | Glass et al. | |
| 5,881,263 A | 3/1999 | York et al. | |
| 6,029,239 A | 2/2000 | Brown | |
| 6,073,233 A | 6/2000 | Chapman | |
| 6,085,314 A * | 7/2000 | Asghar et al. ............... | 712/213 |
| 6,209,077 B1 | 3/2001 | Robertson et al. | |
| 6,209,078 B1 * | 3/2001 | Chiang et al. ................. | 712/36 |
| 6,397,240 B1 | 5/2002 | Fernando et al. | |
| 6,438,679 B1 | 8/2002 | Sollars | |
| 6,507,947 B1 | 1/2003 | Schreiber et al. | |
| 6,577,316 B2 * | 6/2003 | Brethour et al. ............ | 345/505 |
| 6,708,325 B2 | 3/2004 | Cooke et al. | |
| 6,762,761 B2 * | 7/2004 | Devins et al. ............... | 345/503 |
| 6,959,376 B1 | 10/2005 | Boike et al. | |
| 6,961,841 B2 | 11/2005 | Huppenthal et al. | |
| 2002/0066083 A1 | 5/2002 | Patel et al. | |
| 2003/0140222 A1 * | 7/2003 | Ohmi et al. ................... | 713/1 |
| 2003/0167348 A1 | 9/2003 | Greenblat | |

* cited by examiner

*Primary Examiner*—Eric Coleman
(74) *Attorney, Agent, or Firm*—Nixon & Vanderhye P.C.

(57) ABSTRACT

There is provided an apparatus for processing data under control of a program having program instructions and subgraph suggestion information identifying respective sequences of program instructions corresponding to computational subgraphs identified within said program, said apparatus comprising:
 a memory operable to store a program formed of separate program instructions;
 processing logic operable to execute respective separate program instructions from said program; and
 accelerator logic operable in response to reaching an execution point within said program associated with a subgraph suggestion to execute a sequence of program instructions corresponding to said subgraph suggestion as an accelerated operation instead of executing said sequence of program instructions as respective separate program instructions with said processing logic.

20 Claims, 18 Drawing Sheets

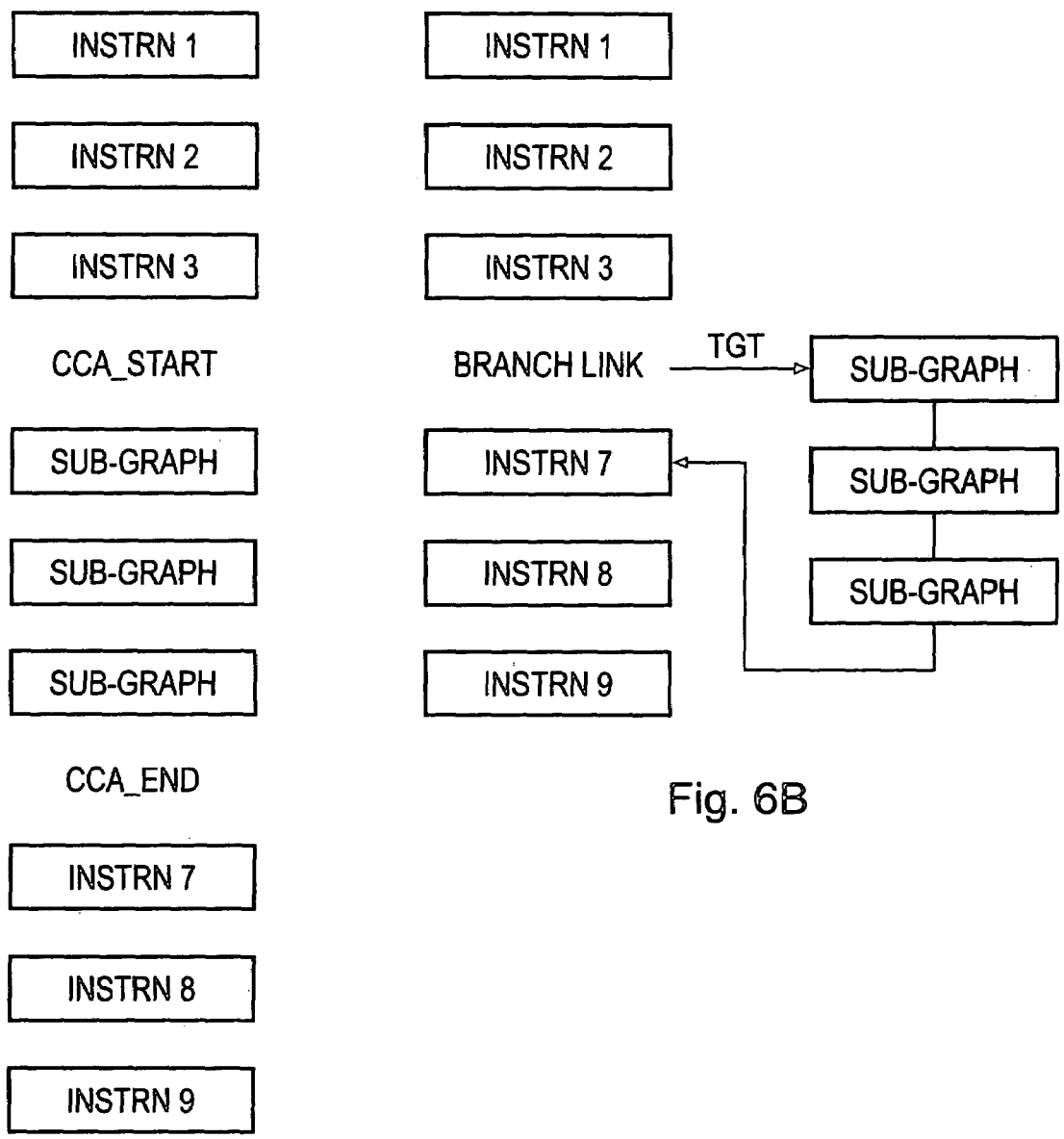

SEQUENCE 1

ADD r2, r1, r0

AND r2, r2, r3    CCA3, {r0, r1, r3, r4} {r5}

SUB r5, r2, r4

Fig. 7A

SEQUENCE 2

ADD r4, r7, r9

AND r4, r4, r5    CCA3, {r9, r7, r5, r10} {r4}

SUB r4, r4, r10

Fig. 7B

ADD    r5, r6, r7

SPILL  r7, ⎿__⏌

SUB    r7, r5, r6

FILL   ⎵ ,r7

ADD    r5, r7, r6

I1
I2
CCA_Start
I3
I4
I5
CCA_Stop
I6
I7

⋮

⋮

I1
I2
CCA_len#3
I3
I4
I5
I6
I7
⋮

⋮
I1
I2
I3'
I4'
I5'
I6
I7
⋮

PROGRAM SUBGRAPH IDENTIFICATION

This application claims the benefit of Provisional Application No. 60/619,949, filed Oct. 20, 2004, the entire content of which is hereby incorporated by reference in this application.

BACKGROUND OF THE INVENTION

1. Field of the Invention

This invention relates to the field of data processing systems. More particularly, this invention relates to data processing systems including an accelerator capable of accelerated execution of some subgraphs within a program.

2. Description of the Prior Art

It is known to provide data processing systems with accelerator hardware operating to accelerate execution of some program subgraphs within a program. As an example, it may be that a program has a particular need to perform a complex operation a large number of times during its normal operation, such as decrypt a large quantity of data from a stream of data using a decryption technique which repeatedly executes the same piece of program code. It is possible that this program code may be written as a sequence of individual program instructions that are sequentially separately executed by a general purpose execution unit. However, it is known to provide special purpose accelerator hardware in such circumstances that can operate to provide hardware support for accelerated execution of such specific processing requirements.

One approach is to add such special purpose accelerated hardware and then add specific instructions to the instruction set of the apparatus to represent the complex operation which is to be performed by the accelerator hardware. As an example, a general purpose instruction set could be augmented by the addition of specific decryption instructions which when encountered would be executed by the decryption acceleration hardware. This approach suffers from a number of disadvantages.

A program written to include the new decryption program instructions in place of the previous sequence of standard program instructions is no longer capable of being executed on a system which does not include the accelerator hardware. Thus, several versions of a computer program may need to be written, tested and maintained, each targeted at different hardware platforms which may or may not contain the hardware accelerator. Furthermore, different versions of a hardware accelerator may be present in different implementations with varying capabilities requiring different programs to be written to reflect those differing capabilities. The special purpose accelerator added to implement the new special purpose instructions also represents a significant design investment and requires the testing and validation for each variant that was produced.

It is also known to provide data processing systems with the capability to examine the stream of program instructions that are being executed to determine if they can be modified/re-ordered or otherwise changed to run in a more efficient fashion. An example is a system which can combine two individual program instructions to form a single fused instruction that results in the same overall processing operation but is able to execute more rapidly. Whilst such systems are effective, the hardware and complexity overhead associated with seeking to identify program instructions that can be safely fused in this way is considerable and a disadvantage.

SUMMARY OF THE INVENTION

Viewed from one aspect the present provides apparatus for processing data under control of a program having program instructions and subgraph suggestion information identifying respective sequences of program instructions corresponding to computational subgraphs identified within said program, said apparatus comprising:

a memory operable to store a program formed of separate program instructions;

processing logic operable to execute respective separate program instructions from said program; and accelerator logic operable in response to reaching an execution point within said program associated with a subgraph suggestion to execute a sequence of program instructions corresponding to said subgraph suggestion as an accelerated operation instead of executing said sequence of program instructions as respective separate program instructions with said processing logic.

The present technique associates subgraph suggestion data with the program code. The program code representing the subgraphs still includes the individual separate program instructions. Accordingly, the program may still be executed on a system which does not include the accelerator with the subgraph suggestion data being ignored in this circumstance and the separate program instructions which are still present being executed in their normal slower, fashion. If the accelerator logic is present, then the system uses the subgraph suggestion information to identify when it reaches a sequence of program instructions that are a subgraph capable of acceleration and at that point invokes the accelerator to perform an accelerated execution of that sequence of program instructions. The provision of the subgraph suggestion information relieves the accelerator from the burden of having dynamically to analyse the computer program for suitable subgraphs that may be accelerated.

It will be appreciated that the subgraph suggestion information can take a wide variety of different forms. Suitable examples include marker instructions embedded within the program, such as subgraph start marker instructions preceding a subgraph and subgraph end marker instructions succeeding a subgraph. Marker instructions may also be associated with a subgraph indicating its location and length rather than its start or end. Other possibilities include outlining (i.e. modifying the code as required) subgraphs into subroutines which are branched to with special branch instructions that indicate that the subroutine is a subgraph capable of acceleration. Standard branch instructions may also be made to function in this way if they are predicated by a qualifying instruction which indicates that the associated branch instruction is to a subgraph capable of acceleration. The subgraph suggestion information may also take the form of compiling the subgraphs into particular forms of normal instructions which are recognised by the accelerator using pattern matching rather than by the addition of extra instructions into the program. It is also possible that the accelerator can be made to operate to assume that a branch to a routine with a predetermined characteristic, such as a length less than a certain minimum, is a branch to a subgraph capable of acceleration. Another possibility is that any subroutine call cal be assumed to be to a subgraph capable of acceleration. If the accelerator fails to support the subroutine concerned then the system will revert to execute it in the normal way. The compiler may be arranged to outline subgraphs into subroutines so as to use this technique or the subgraphs may occur naturally as subroutines.

The accelerator logic itself may be configurable using stored accelerator configuration data such that it can be made to execute as accelerated operations a wide variety of different sequences of program instructions corresponding to respective computational subgraphs. Whilst the additional complexity of making the accelerator configurable in this way under acceleration configuration data control may seem a disadvantage, this approach enables a hardware implementation to be designed, tested and validated once and then reused in a wide range of circumstances without further hardware design, testing and validation being required since only the configuration data for the accelerator needs to be changed to enable it to accelerate different computational subgraphs as may be required by the particular application or use. The accelerator configuration data may be determined dynamically at runtime or alternatively may be determined during compilation of the computer program at the same time as the subgraph suggestion information is being identified.

The accelerator configuration data can be stored as part of the computer program, embedded within it (e.g. at the end of associated outlined subroutines corresponding to computational subgraphs), appended to the program at its end (e.g. in the form of a table of accelerated configuration data), or stored in a special configuration data memory.

The configuration data and the identification of computational subgraphs for acceleration may conveniently be associated with the action of a branch prediction unit. A branch prediction unit can be responsive to the subgraph suggestion information to identify a sequence of program instructions as capable of acceleration by the acceleration unit and use this identification to access appropriate configuration data for the accelerator associated with that computational subgraph and then trigger the acceleration unit to execute that computational subgraph when the program instructions reach the appropriate point in the pipeline.

The subgraph suggestion information is advantageously added either prior to execution of the program, such as during its compilation or its preprocessing on the target application platform, at runtime by software, which may run concurrently or as a background task, at runtime by special purpose hardware or in another way.

Viewed from another aspect the present invention provides a method of processing data under control of a program having program instructions and one or more subgraph markers identifying respective sequences of program instructions corresponding to computational subgraphs identified within said program, said method comprising:

storing a program formed of separate program instructions within a memory;

executing respective separate program instructions from said program with processing logic; and in response to reaching an execution point within said program associated with a subgraph marker executing a sequence of program instructions corresponding to said subgraph marker as a combined operation with accelerator logic instead of executing said sequence of program instructions as respective separate program instructions with said processing logic.

Viewed from a further aspect the present invention provides a computer program on a carrier medium comprising a program having program instructions and one or more subgraph markers identifying respective sequences of program instructions corresponding to computational subgraphs identified within said program, said computer program being operable to control an apparatus for processing data to perform a method as claimed in claim 17.

A complementary aspect of the invention provides a method of compiling a computer program to form executable program instructions comprising:

forming a stream of executable instructions capable of execution by processing logic within an apparatus for processing data;

identifying one or more computation subgraphs within said stream of executable program instructions; and associating subgraph suggestion information with said executable program instructions, said subgraph suggestion information being operable to identify sequences of executable program instructions capable execution as accelerated operations by optional acceleration logic within said apparatus for processing data.

This complementary aspect of the invention relates to a compiler modified to analyse a computer program to identify computational subgraphs which are appropriate targets for an accelerator unit. The compiler then generates the subgraph suggestion information to be associated with that computer program. As will be appreciated, compilers already identify subgraphs as part of the way in which they normally perform their compilation operations and it is particularly convenient to modify and extend this subgraph identification to encompass the identification of computational subgraphs which may be executed by an accelerator as well as subgraphs to be represented by individual program instructions.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6A schematically illustrates a first way of indicating to the accelerator which portions of the program code are to be accelerated;

FIG. 6B shows a further way of indicating to the accelerator which portions of the program code are to be accelerated;

FIGS. 7A and 7B together schematically illustrate how configuration data can be reused for two different subgraphs;

FIG. 9 schematically illustrates instructions that are used to promote compatibility with data processors not having an accelerator;

DESCRIPTION OF THE PREFERRED EMBODIMENTS

Figure 1:
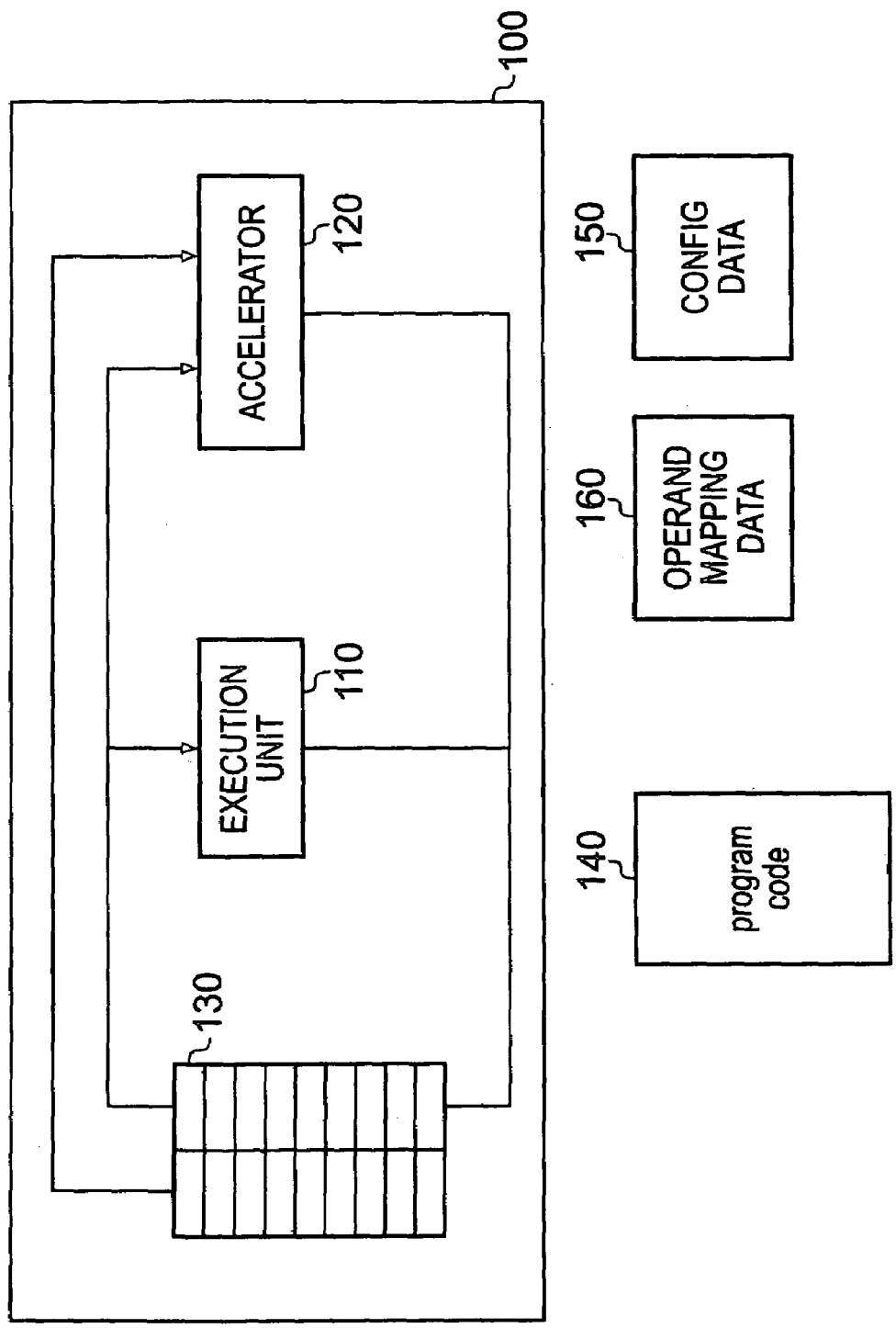
FIG. 1 schematically illustrates an information processor having an acceleration unit.

FIG. 1 schematically illustrates an information processor according to the present technique. The system comprises a processor core 100 having an execution unit 110, an accelerator 120 and a register bank 130. The processor core is operable to execute program code 140, a portion of which is executed using the execution unit 110 and another portion of which is executed using the accelerator 120 in dependence upon a set of configuration data 150 and set of operand mapping data 160. The accelerator 150 is connected in parallel to both the execution unit 110 and the register bank 130.

The accelerator 120 comprises an array of functional units that are configurable in dependence upon characteristics of the particular portion of program code to be executed by the accelerator 120. The accelerator 120 is configured in dependence upon the configuration data 150 to execute a series of separate program instructions corresponding to a particular computational subgraph of the computer program as a combined operation such that processing operations associated with one or more stages of the combined operation are mapped to one or more functional units of the accelerator. The operand mapping data 160 is used to specify a mapping between input and output operands for operations executed on the functional units of the accelerator and locations in the register bank 130 and is used together with the configuration data to define the computations to be performed by the accelerator 120.

The execution unit 110 is operable to individually execute separate instructions of the program code 140, whereas the accelerator 120 is operable to accelerate execution of, for example, certain frequently executed and/or system-critical computational subgraphs representing a portion of the program code 140 by combining the separate program instructions of those computational subgraphs to form combined operations. The configuration data 150 configures the accelerator 120 in a manner that is tuned to the particular computational subgraphs to be executed by it. The program code of the computational subgraphs selected for acceleration is sufficiently self-contained such that the variables associated with the computational subgraph do not propagate elsewhere in the program code 140. The execution unit 100 is an ALU execution unit as may typically be found in a RISC data processor, whereas the accelerator 120 executes combined operations.

Figure 2:
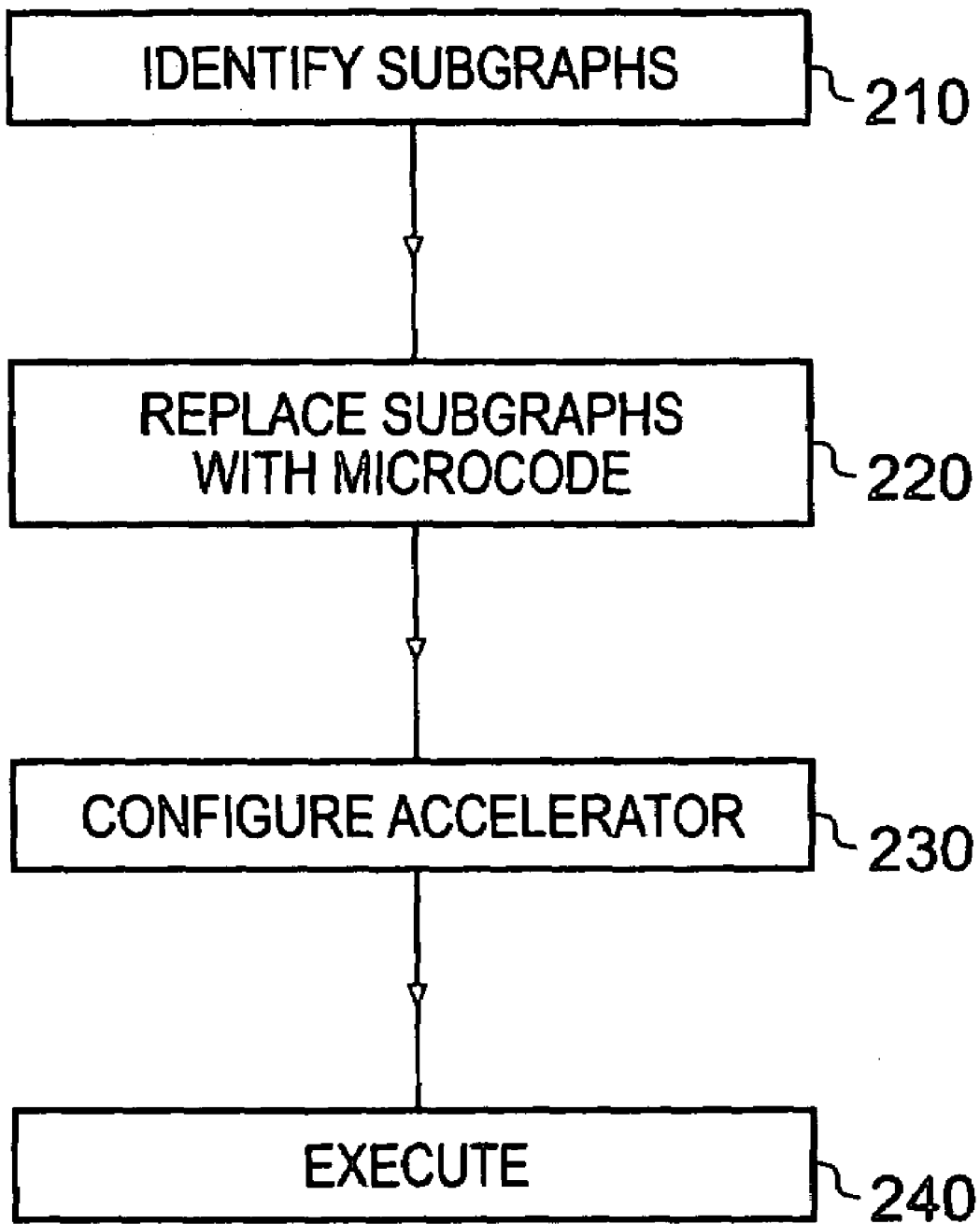
FIG. 2 is a flow chart that schematically illustrates the states involved in the dynamic configuration of the accelerator.

FIG. 2 is a flow chart that schematically illustrates stages involved in dynamic configuration of the accelerator according to one example embodiment. The process begins at stage 210 with identification of the computational subgraphs within the program code 140 and proceeds to stage 220 where the identified computational subgraphs are replaced within a trace cache by microcode and subsequently proceeds to stage 230 where the accelerator 120 is configured in a manner tuned to execute selected ones of the subgraphs that were identified at stage 210. Finally, at stage 240 the subgraph code is executed by the accelerator 240.

The identification of subgraphs at stage 210 can be performed in at least two alternative ways. Firstly, the subgraphs may be identified statically by a compiler during a compilation stage of the program code 140, which involves generation of machine instructions (executable code) from the program code 140. Secondly, the subgraphs may be identified dynamically at runtime by hardware and/or software in the processor core 100. In this particular arrangement, subgraph identification is performed dynamically using information from a retiring instruction stream corresponding to trace data, this data being read by the subgraph identification hardware from a trace cache.

Figure 3:
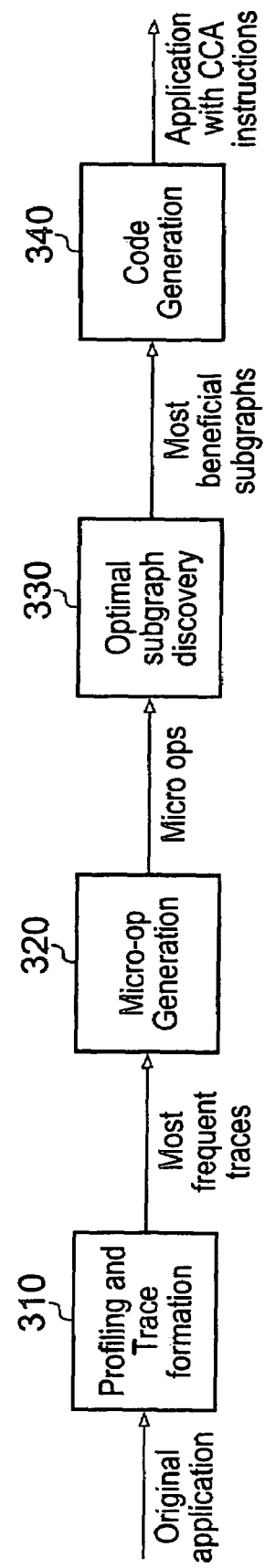
FIG. 3 schematically illustrates a work for subgraph identification.

FIG. 3 schematically illustrates a workflow for subgraph identification at the program compilation stage and the subsequent generation of micro-operations (corresponding to stage 220 of FIG. 2). The workflow starts at a stage 310 where profiling and trace formation is performed on the program code 140, which is received as input to this stage. A trace is a sequence of basic blocks that are highly likely to be executed sequentially. A basic block usually starts at an instruction that is a target of one or more branch instructions and is usually terminated by a branch instruction or a predetermined limit on block size. Traces are identified by profiling the program code 140 on sample input data. The profiling and trace formation stage 310 outputs data corresponding to the most frequently executed traces and supplies it to a micro-operation generation stage 320. This stage 320 is optional since it is required only for a certain subset of microarchitectures such as, for example, the microarchitecture of the x86 instruction set. In order to identify subgraphs of program code that can be replaced at runtime, the compiler is operable to convert its internal representation of the program code into a representation that reflects the run-time instruction stream. For the x86 instruction set the instructions are converted to micro-operations (or "uops") for dynamic execution. The majority of x86 instructions translate to a single uop although some x86 instructions do translate into a plurality of uops. Thus, at stage 320 the compiler generates uops from the program instructions of the traces and also stores a mapping between instructions and their respective uops to enable code generation at a final stage 340 of the workflow.

The micro-operation generation stage 320 supplies uops as input to an optimal subgraph discovery stage 330. The tasks performed at this stage comprise two logically distinct phases: (i) candidate subgraph enumeration, which involves enumerating all subgraphs that could potentially be selected for execution by the accelerator 120 as combined instructions; and (ii) candidate subgraph selection, which involves selection of a subset of the enumerated subgraphs for execution by the accelerator. The selection is performed by implementing a numerical weighting to increase the likelihood that subgraphs on critical paths of the program code will be selected for acceleration in preference to those subgraphs on non-critical paths. Data representing the selected subgraphs is passed from stage 330 to a code generation stage 340.

At the code generation stage 340, the compiler generates machine code corresponding to the program code 140. Since, in this particular arrangement, the uops corresponding to the subgraphs selected at stage 330 will be dynamically replaced by combined instructions at runtime, the compiler facilitates this process by inserting marker instructions into the complete uop code sequence corresponding to the translated program code 140 to mark uops associated with the selected subgraphs. The insertion of marker instructions into the executable program code does not preclude the execution of that code on a data processor not having an accelerator since in this case the marker instructions can readily be converted into null operations (NOPs). At the code generation stage 340, the mapping information (between x86 instructions and uops) that was stored at stage 320 is utilized. In particular, for each selected subgraph of uop code, the corresponding x86 instructions are grouped together and the instructions thus assembled are topologically sorted based on the structure of the subgraph and placed sequentially in memory.

Figure 4:
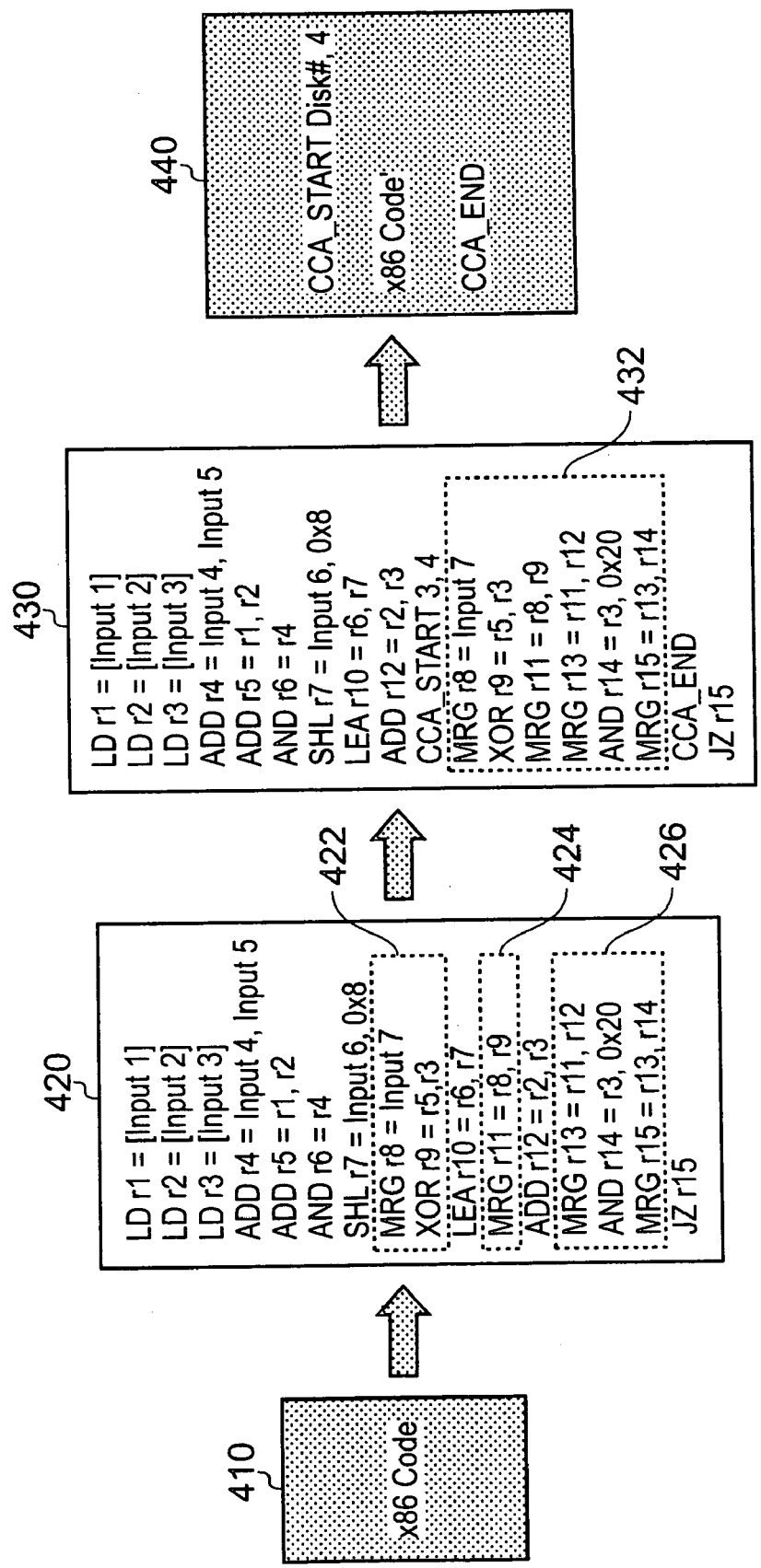
FIG. 4 schematically illustrates the code generation stage of the arrangement of FIG. 3.

The code generation stage 340 is illustrated in more detail in FIG. 4. FIG. 4 shows a block of x86 instructions 410, which is converted to a block 420 of uops (micro-operations). The six uops surrounded by dashed boxes 422, 424, 426 in block 420 are those uops corresponding to the subgraphs selected at stage 330 of FIG. 3. Note that the uops of the subgraph do not represent a contiguous block of uops in this case. The next stage of the process is shown in block 430 where the subgraph uops of block 420 have been grouped into a contiguous block 432 and they have been topologically sorted. Furthermore marker instructions CCA_START and CCA_END have been inserted to identify the block of uops of the subgraph to be executed by the accelerator 120. Finally, the sequence of uops is translated back to x86 instructions represented by block 440 to produce x86 program instruction code augmented by the marker instructions. This augmented code is used during dynamic replacement of the subgraph code for execution by the accelerator 120.

Figure 5B:
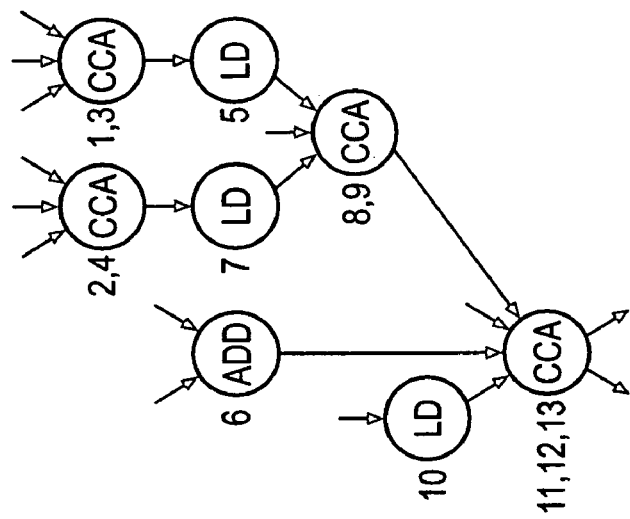
FIG. 5B schematically illustrates a portion of program data flow graph shown in FIG. 5A after subgraph replacement.
Figure 5A:
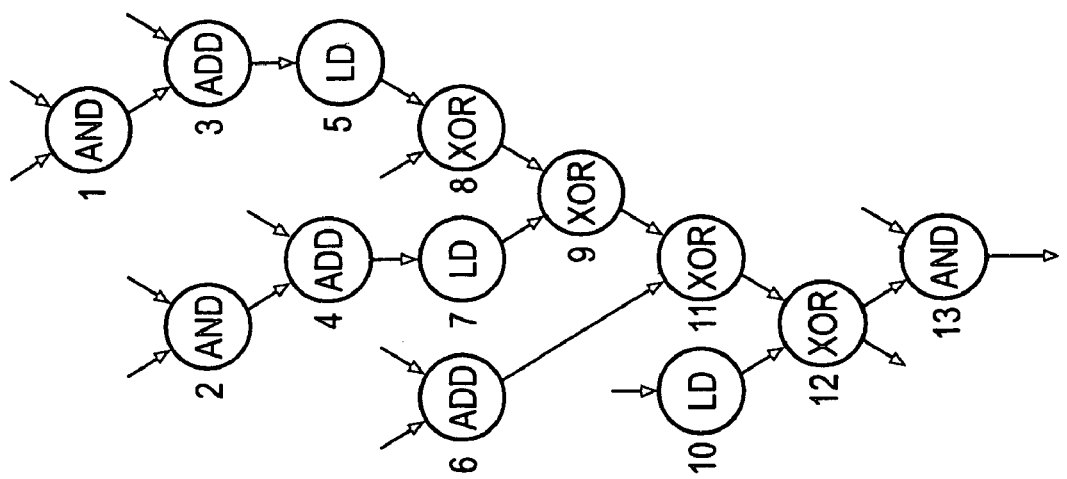
FIG. 5A schematically illustrates a data flow graph for a portion of a program application.

FIG. 5A schematically illustrates a data flow graph for a portion of a program application. FIG. 5B shows schematically illustrates the same portion of the program data flow graph of FIG. 5A but after certain subgraphs have been replaced by combined operations. FIG. 5A shows a sequence of thirteen numbered operations such as logical AND operations, exclusive OR (XOR) operations and loads (LD). A subgraph discovery algorithm operates (dynamically) on the dataflow graph of FIG. 5A, starting from the last operation in the sequence, i.e. operation 13 and seeks a match with operations in the sequence having lower numbers. The match takes into account the architectural constraints of the accelerator 120. In particular the constraints that are taken into account are:
  the number of inputs/outputs of the accelerator;
  illegal opcodes i.e. opcodes that cannot be mapped onto functional units of the accelerator;
  subgraph outputs cannot feed subgraph inputs (this constraint serves to avoid deadlock);
  the operation's "slack" i.e. how critical that operation is to the total dependence height of the data flow graph.

It can be seen from FIG. 5D that operations 11, 12 and 13 have been grouped into a first subgraph, operations 8 and 9 into a second subgraph, operations 2 and 4 into a third subgraph and operations 1 and 3 into a fourth subgraph. With regard to the first subgraph, it is apparent that in addition to operations 12 and 13, either operation 10 or operation 11 could have been added to the first subgraph. However, since operation 10 was determined to have slack of five which is greater than the slack of zero associated with operation 11, operation 11 was added to the first subgraph in preference to operation 10. Furthermore, although operation 9 could, in principle, have been added to the group of operations forming the first subgraph, this option was ruled out by the input/output constraints since a subgraph comprising operations 9, 11, 12 and 13 would require five inputs whereas the accelerator of this example embodiment is configured to accept only up to four inputs. Thus node 9 is discarded from the first subgraph and its parent operations are ignored. A similar process is used to construct the second, third and fourth subgraphs. As shown in FIG. 5B, the four subgraphs are selected for execution as respective combined operations by the accelerator 120. The configuration data 150 specifies how each of the four combined operations is to be mapped onto the matrix of functional units of the accelerator 120.

FIG. 6A schematically illustrates one way of indicating to the accelerator which portions of program code are to be accelerated. In this example separate program instructions 1, 2, 3, 7, 8 and 9 are individually executed by the execution unit 110 whereas the three separate program instructions 4, 5 and 6 together form a computational subgraph that will be executed as a combined operation by the accelerator 120. The portion of program code to be accelerated is marked by the special-purpose CCA_START instruction and a CCA_END instruction so that the execution path jumps from the execution unit 110 for instruction 3 to the accelerator 120 when the CCA_START instruction is encountered and returns to the execution unit 110 when the CCA_END instruction is encountered for individual execution of the instructions 7, 8 and 9. In the example of FIG. 6A, the subgraphs to be accelerated are stored inline in the program code. Retaining the original subgraph inline in the program code facilitates execution of the code as individually executed separate program instructions by data processing systems not having an accelerator 120. When the code of FIG. 6A is executed by a pipelined data processor having an accelerator, the presence of the subgraph to be accelerated inline in the program code may, in some cases, cause problems with the fetch stage of the pipeline such as a pipeline bubble. This can arise due to the fact that the processor must jump from individual execution of the last separate program instruction before the CCA_START instruction, i.e., instruction 3 to individual execution of the first separate program instruction following the CCA_END instruction, i.e. instruction 7. The accelerator performs the processing operations between the CCA_START and CCA_END. To prevent the occurrence of a pipeline bubble the following methods can be used in different arrangements according to the present technique:

(i) rewriting of the program code in a trace cache;
(ii) outlining of the subgraph code to be accelerated into a function (see description of FIG. 6B below) and using a branch predictor to hold the configuration data for the accelerator and to predict that such an accelerator configuration exists and hence the function call is not required (as described in relation to FIG. 13 above);
(iii) using a branch prediction scheme to spot the CCA_START instruction at the fetch stage of the pipeline and to use this to determine that a suitable accelerator configuration exists for that subgraph and to initiate fetches from the instruction after the subgraph to be accelerated (instruction 7 in this case).

Returning now to FIG. 2, at stage 230 the accelerator 120 is configured such that it is specifically tailored for execution of combined instructions corresponding to the selected subgraphs. The accelerator is configured using configuration data 150. The accelerator 120 is arranged as a matrix of functional units. This matrix structure allows for the sequential propagation of data between functional units and enables any parallelism in the computational subgraphs selected for acceleration to be exploited.

The configuration overhead is considerably reduced relative to known acceleration techniques, such as FPGAs, by sacrificing some generality yet retaining sufficient flexibility by selecting a few "computational primitives", such as add, subtract and shift, from which to construct an accelerator functional unit matrix. The computational primitives represent frequently occurring operations in dataflow graphs of computer programs. The use of small number of computational primitives reduces both the time required for reconfiguration of the accelerator and the volume of configuration data required to set up the accelerator.

The number of rows and number of columns of functional units forming the matrix of the accelerator 120 can be appropriately selected at the design stage according to the program applications to be executed. The accelerator 120 can be characterized according to three parameters: depth, width and operation capabilities. The depth is the length of the longest column of functional units whereas the width is the number of functional units that can calculate in parallel. The operation capabilities are the particular set of computational primitives that can be mapped onto a functional unit of the accelerator. With regard to the accelerator depth, there is a tradeoff between the ability to implement the largest possible number of subgraphs in a program application and the increased latency that is incurred by increasing the depth. With regard to accelerator depth, the characteristics of computer program subgraphs for the programs to be executed will have computational subgraphs having a range of widths. The relative frequencies of subgraphs having different widths at each depth level can be used to determine the most efficient configuration of functional units. A triangular configuration with the largest width at the lowest depth has been found to be particularly efficient. With regard to the operation capabilities, Table 1 below shows the relative of a number of different operations in a set of the most common subgraphs for a benchmark group of applications. It is apparent from Table 1 that the most frequently appearing operations are logical additions, logical AND operations, move operations and sign extensions. Such frequency data can be used to select the computational primitives that are mapped onto the functional units of the accelerator. Due to latency considerations, it may be efficient to exclude certain operations from the accelerator, for example, multiply/divide operations, memory operations and load operations are excluded in the present arrangement. To support load operations, in alternative arrangements stall circuitry can be incorporated in the accelerator to accommodate non-uniform latencies due to cache effects. However, since this make integration of the accelerator into the processor more difficult, the stall circuitry is not incorporated in the present arrangement.

Table 1 shows that 48.3% of operations involve either only wires (e.g. SEXT and MOV) or a single logic level (e.g. AND and OR) whilst a further 33.9% of operations (e.g. ADD, SUB, CMP) can be handled by an adder/subtracter. Thus, an adder/subtracter and wire/logic functional units are a good choice of computational primitives to be supported by the accelerator. Shifters are excluded as computational primitives in this particular arrangement since barrel shifters are too large and incur significant delays, although efficient barrel shifter implementations (e.g. full custom rather than synthesised) do exist and could be included. However, it will be appreciated that a different subset of computational primitives could be selected in a different arrangement whilst still representing an embodiment of the present technique.

TABLE 1

| Uop | Opcode Semantics | Relative Frequency in common subgraphs |
| --- | --- | --- |
| ADD | Addition | 28.69 |
| AND | Logical AND | 12.51 |
| CMP | Comparison | 0.38 |
| LSL | Logical left shift | 9.81 |
| LSR | Logical right shift | 2.37 |
| MOV | Move | 11.66 |
| OR | Logical OR | 8.66 |
| SEXT | Sign extension | 10.38 |
| SUB | Subtract | 4.82 |
| XOR | Logical exclusive OR | 5.09 |

Figure 14A:
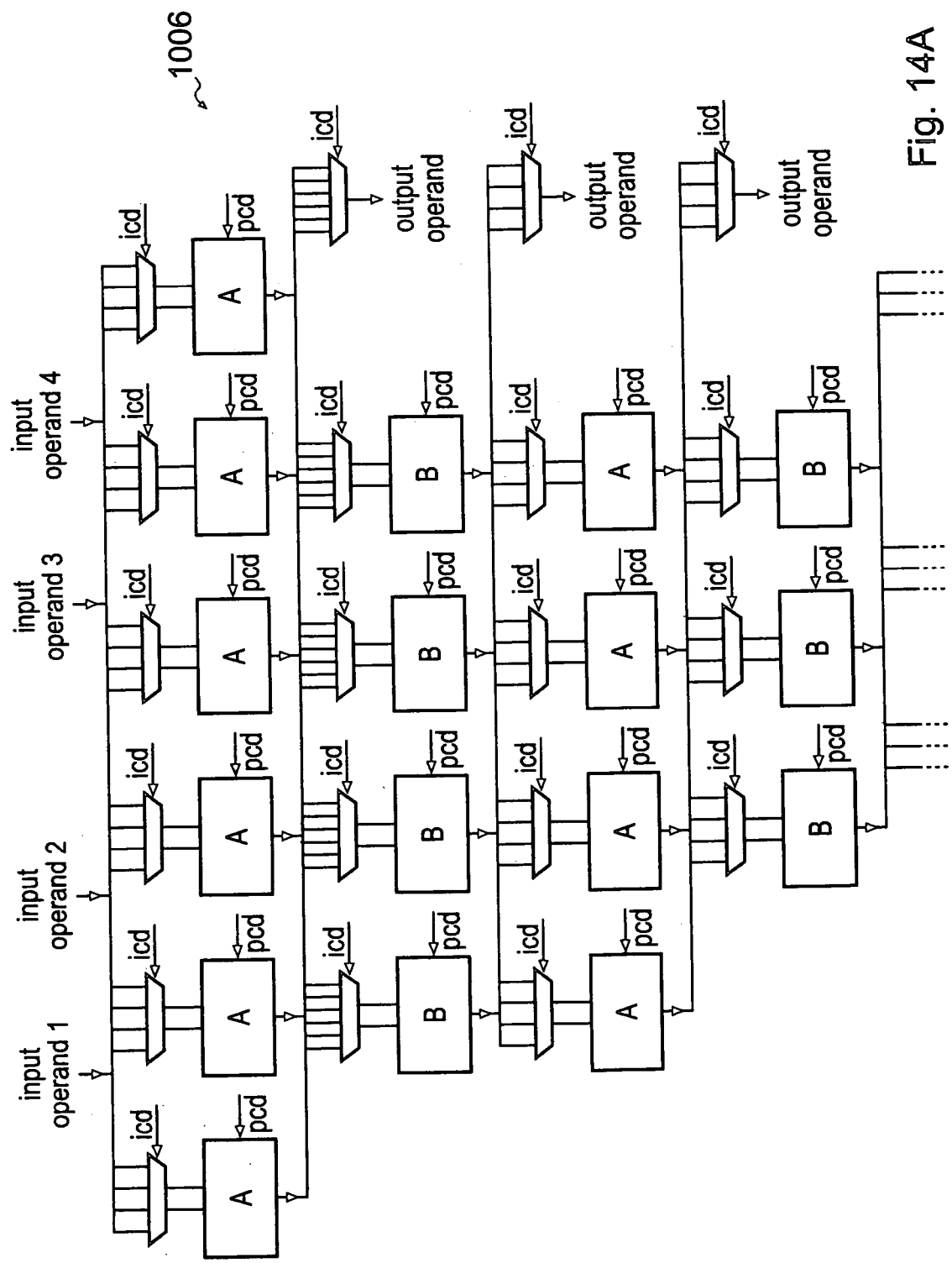
FIGS. 14A and 14B together illustrate an accelerator unit.
Figure 14B:
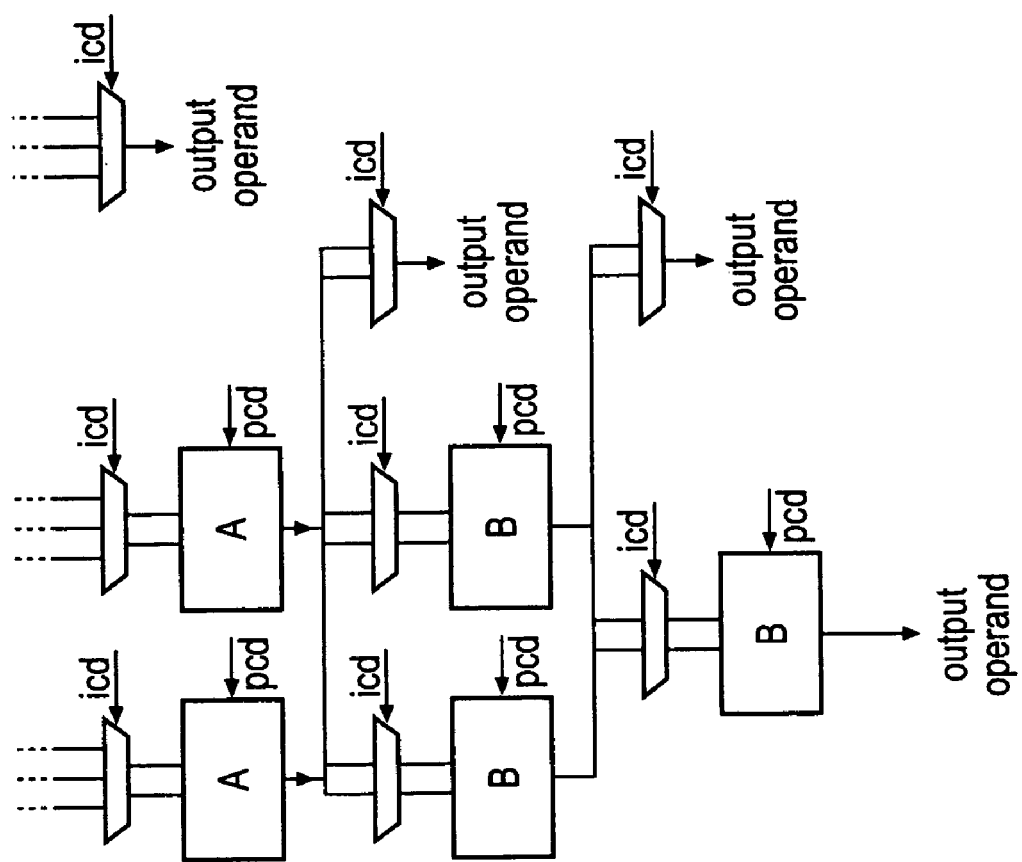

FIGS. 14A and 14B (as described above) together illustrate an accelerator matrix according to the present technique. In that particular arrangement alternate rows of functional units perform 32-bit addition/subtraction and logical operations whereas the intervening rows of functional units perform only logical operations, which include AND, OR, XOR, NOT, SEXT, MOV and bit extraction. The accelerator 120 has a depth of seven and has four inputs and two outputs. Any of the four inputs of FIG. 14A can drive the six functional units in the first depth level and the outputs of each level are fully connected to the inputs of the functional units of the next level. Each functional unit of the accelerator array has four opcode bits that define its functionality. Furthermore signals to control the bus that connects outputs of one level to one or more of the inputs of the next level are required. The number of bus control signals corresponds to twice the number of functional units in the next level since there are two output ports for each functional unit and each output could feed each input of functional units in the next level. Control bits are also used to specify which functional unit provides the second output. The total number of control bits (i.e. configuration data) used for the arrangement of FIGS. 14A and 14B is two hundred and forty-five bits.

The execution unit 110 is a pipelined data processor and the accelerator 120, which comprises the matrix of functional units, is readily integrated into the execution unit pipeline. The datapath overhead associated with the integration of the accelerator 120 with the execution unit 110 is for additional steering logic from reservation stations and bypass paths from accelerator 120 outputs. In the particular arrangement of FIG. 1, the accelerator 120 itself is not pipelined. This simplifies the construction, since in arrangements where the accelerator 120 is actually pipelined the matrix of functional units shown in FIGS. 14A and 14B comprises latches and intermediate results corresponding to internal portions of the matrix are in fact forwarded. Use of a non-pipelined accelerator in the present arrangement thus simplifies the integration of the accelerator 120 with the execution unit 110.

As mentioned above the accelerator of FIGS. 14A and 14B has four inputs and two outputs. Thus, in this example arrangement, a four input, two output instruction will have to be accommodated into the execution unit 110 pipeline. This is accomplished by splitting each accelerator operation into two uops, each having two inputs and one output. By consecutively supplying the to uops to the accelerator, the desired four input and two output instruction can be executed without altering register renaming, reservation stations, re-order buffering or any register read stage of the pipeline. However, the scheduling logic is appropriately adapted to guide two uops to the accelerator.

To avoid the possibility of an external interrupt causing only half of the two uop instruction execution to be committed, the data processing apparatus is configured to commit the two uops atomically. The configuration data 150 is communicated along with the two uops and since there is a total of two-hundred and forty-five bits of configuration data, each of the two uops carries around one-hundred and thirty bits of configuration data. In this arrangement, the operand mapping data 160 is specified as an opcode of the special-purpose accelerator instruction CCA_START (see FIG. 4) and the subsequent description of FIG. 6A. The configuration data 150 can be generated dynamically, for example, during the decode stage of the pipeline. However, since generation of the configuration data at the decode stage can potentially increase latency, in this particular arrangement configuration data for the computational subgraphs selected for acceleration is generated prior to program execution (i.e. statically). This pre-generated configuration data is saved into a translation table when the program application is loaded by the execution unit 110. The CCA_START instruction has a field that holds a pointer to the translation table for the configuration data. Alternative arrangements, which rely on dynamic generation of configuration data are more appropriate for program applications having a large number of subgraphs since this avoids any constraint on the number of subgraphs used being imposed by the size of the translation table.

Returning now to the flow chart of FIG. 2, after the accelerator has been appropriately configured to execute the subgraphs selected for acceleration, finally at stage 240 the selected subgraphs are executed by the accelerator 120.

FIG. 6B schematically illustrates an alternative way of indicating to the accelerator 120 the selected portion of program code that should be subject to accelerated execution. In this case, the instructions 4, 5 and 6 which have been identified for execution as a combined operation by the accelerator are stored separately from the program instructions to be executed by the execution unit 110. In this example, a branch link instruction is used to call the accelerator to execute the subgraph formed by instructions 4, 5 and 6. The address of the start of the subgraph is specified as a target of the branch link instruction and following accelerated execution of the subgraph, the execution automatically returns to individual execution of instructions 7, 8 and 9 by the execution unit 110. Thus the computational subgraph to be executed by the accelerator is called from the program code like a subroutine. In this particular arrangement the operand mapping data is specified as an argument of the branch link instruction but in an alternative arrangement the branch link instruction has an argument that provides an index to a look-up table that specifies the operand mapping data. Another possibility is that an ordinary branch is used and the hardware records the register mapping and stores this in an internal (non-architectural) structure for later reference.

FIGS. 7A and 7B schematically illustrate how configuration data can be re-used for the acceleration of two different subgraphs. FIG. 7A shows a first sequence of operations comprising: (i) an addition that reads input values from registers r1 and r0 and writes an output value to register r2; (ii) a logical AND operation that reads input values from registers r2 and r3 and writes an output value to register r2; and (iii) a subtraction operation that reads input values from registers r2 and r4 and writes an output value to register r5.

FIG. 7B shows a first sequence of operations comprising: (i) an addition that reads input values from registers r7 and r9 and writes an output value to register r4; (ii) a logical AND operation that reads input values from registers r4 and r5 and writes an output value to register r4; and (iii) a subtraction operation that reads input values from registers r4 and r10 and writes an output value to register r4.

The present technique recognizes that by separately specifying operand mapping data and configuration data, the configuration data can be re-used for different subgraphs. In the particular example of FIG. 7, the subgraphs corresponding to both the first sequence and the second sequence involve an ADD followed by a logical AND followed by a subtraction SUB, the only difference being in the registers specified from which to read data and to which to write data at each stage. The specification of different register numbers for the first and second sequences may be difficult to avoid due to compiler register allocation restrictions. However, in some arrangements the register allocation of the compiler can be steered to promote allocation of the same registers for the same subgraph sequences.

For the sequences of FIGS. 7A and 7B, despite the differences between the first sequence and the second sequence in the registers specified, once a configuration corresponding to an ADD, AND and SUB has been specified for the first sequence, it can be re-used for execution of the second sequence. The differences between registers used during the computations is accommodated by specifying both the registers required for inputs to the combined operation and the register associated with the final output when calling the appropriate configuration data. Thus, as shown in FIG. 7A, configuration data CCA3 is called to set up the accelerator to execute the subgraph and input operands r0, r1, r3 and r4 are specified along with the final output operand r5. Note that the register r2 is not specified since it is associated with storage of intermediate results of the combined operation, which in practice are simply passed from one accelerator matrix level to the next, rather than actually being stored in the specified register.

Similarly, as shown in FIG. 7B, configuration data CCA3 is called to set up the accelerator to execute the three operations of the sequence and registers r9, r7, r5 and r10 are specified as sources of input operands whereas r4 is specified for the final output value of the subgraph. Note that r4 is not specified as an input operand since it holds only intermediate results of the computation. Although in this example register values have been specified for storage of input and output values, in alternative arrangements operand stack positions could instead be specified for applications that use stack-based operand storage. Furthermore, rather than specifying the input and output register values of the operand mapping data inline as a field of a configuration instruction CCA3, a marker instruction such as CCA3 could have a field for specifying a pointer to the operand mapping data and/or a field for specifying a pointer to the configuration data.

Figure 8:
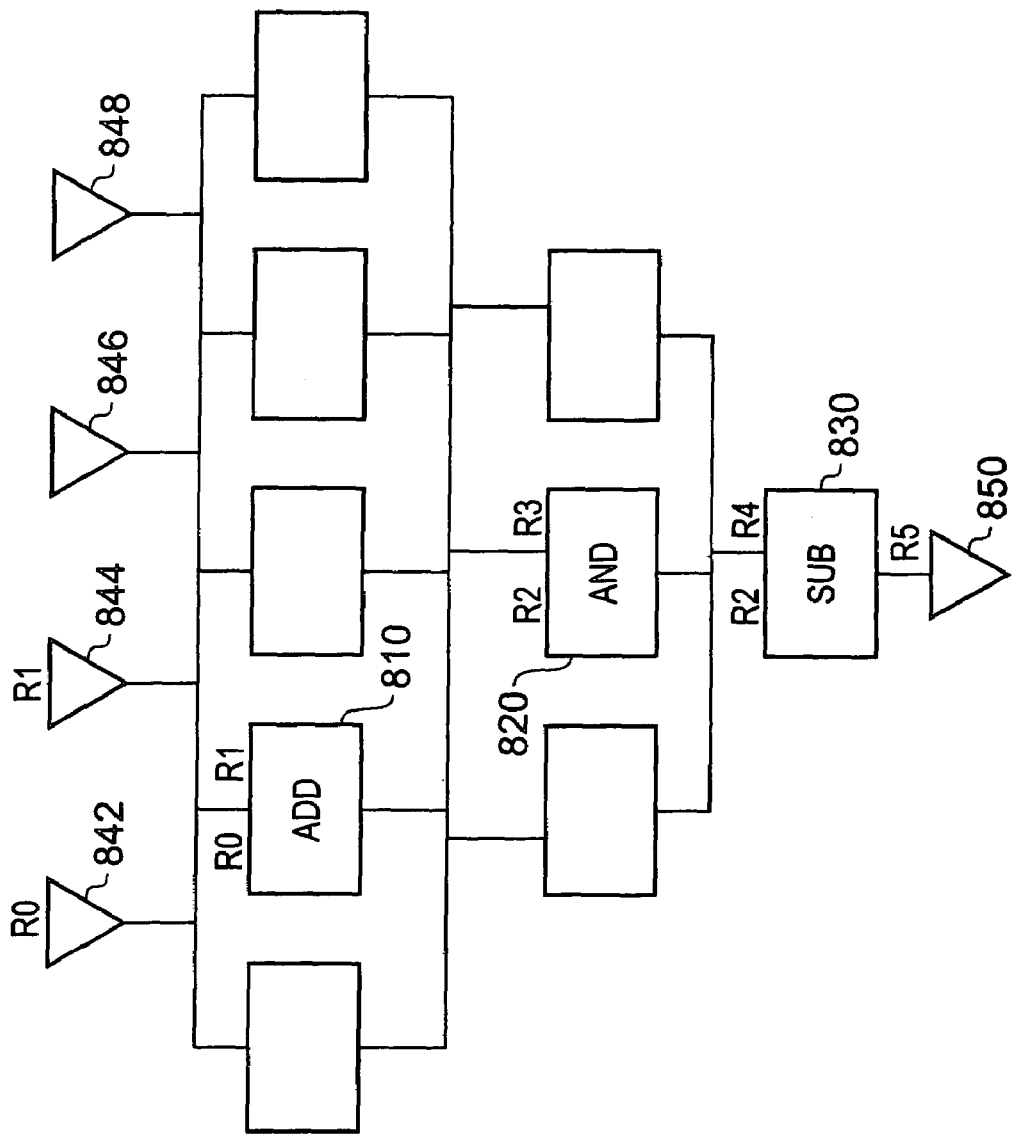
FIG. 8 schematically illustrates how operations corresponding to the sequence of FIG. 7A are marked onto the accelerator matrix.

FIG. 8 schematically illustrates how the operations of the first sequence of FIG. 7A are mapped onto the matrix of functional units of the accelerator. The accelerator in this example arrangement has four inputs, a single output and three depth levels of functional units. The ADD operation is mapped to a functional unit 810 of the first level, the AND operation is mapped onto a functional unit 820 of the second level and the SUB operation is mapped onto a functional unit 830 of the third level. The four inputs to the first level are 842, 844, 846 and 848 and two of these inputs are used to feed values from r0 and r1 to the first-level functional unit 810. Some configuration data is required to ensure that the bus delivers both of these inputs to the correct functional unit. Further configuration data specifies that the output of the AND operation should be supplied as an input to the second-level functional unit 820. The second input operand for this stage i.e. r3 is fed in through one of the inputs to the first level. The output of the logical AND performed by functional unit 820 is supplied as one input to the third-level functional unit 830, which is configured to perform a subtraction. The second input to the subtraction is a value read from r4, which is also supplied via one of the first-level inputs 842, 844, 846, 848. The final result of the subgraph operation emerges from output terminal 850 and in this case will be written to register r5.

FIG. 9 schematically illustrates "SPILL" and "FILL" instructions that can be used to enable program code in which selected subgraphs have been marked for execution by the accelerator to be executed by data processors that do not comprise an accelerator. FIG. 9 shows subgraph code comprising a first ADD instruction, a subtract (SUB) instruction and a second ADD instruction. The first ADD instruction reads values from r6 and r7 and writes the resut of the addition to r5. The SUB instruction reads the values associated with r5 and r6 as inputs and associates the output of the subtraction with r7. The second ADD operation reads values associated with r7 and r6 as inputs and outputs the final result to r5. Since in this accelerated subgraph, the register r7 is used as an input value for the first operation but is only used as an internal register value thereafter, the register r7 can be re-allocated by the accelerator after the input value from the first addition operation has been read from it. This is because for subsequent stages of the combined operation no result values need actually be written to or read from r7. This enables more efficient use of limited register resources in the data processing system employing the accelerator. However, backwards compatibility with data processors not having an accelerator according to the present technique is ensured by introducing a SPILL instruction after the first ADD instruction to store the contents of r7 to memory and a fill instruction between the SUB instruction and the second ADD instruction to retrieve the stored value from memory. Thus the SPILL and FILL instructions are analogous to a stack push and a stack pop respectively.

Figure 10:
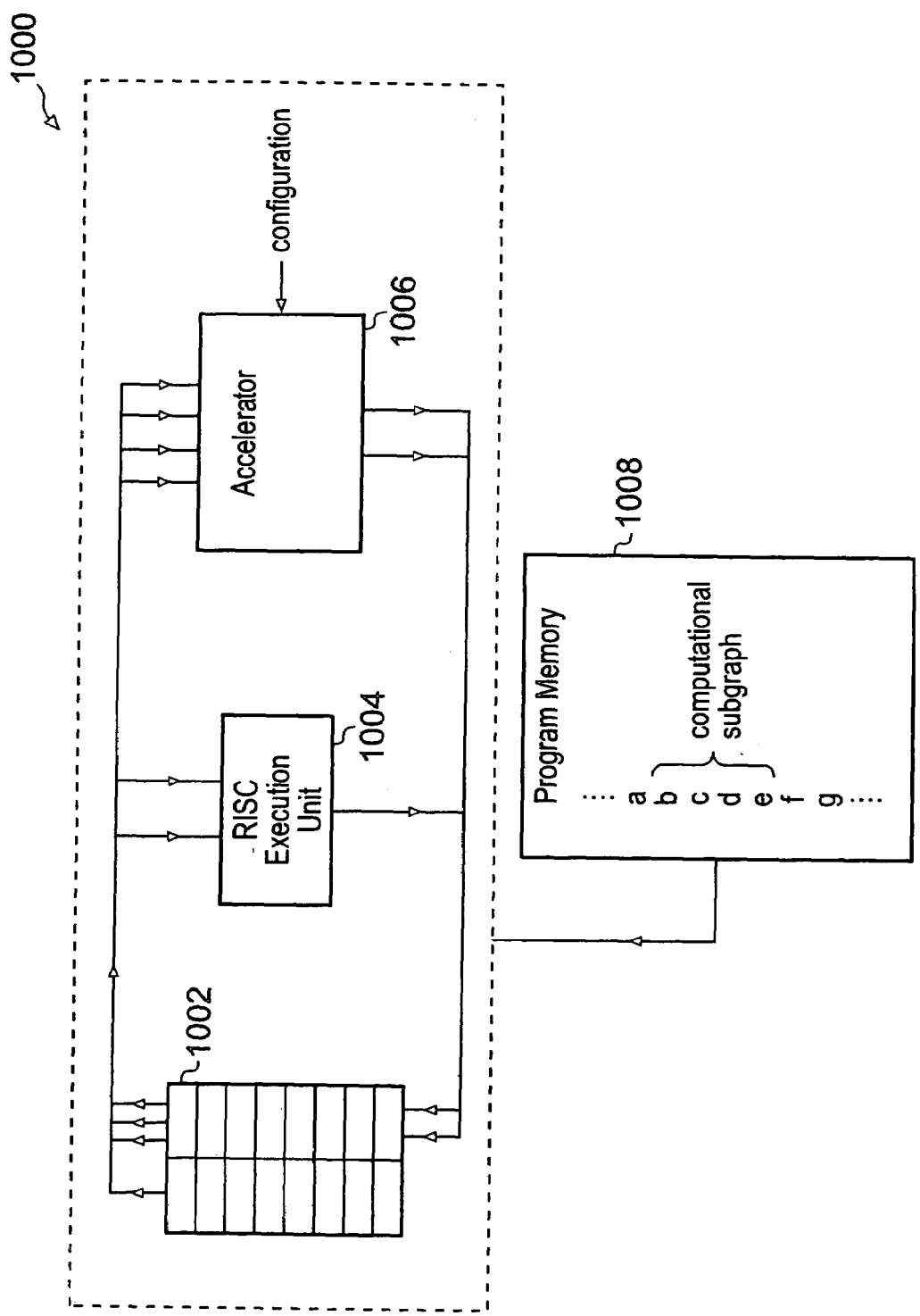
FIG. 10 schematically illustrates a data processing system including an accelerator unit for accelerating computational subgraphs within a program.

FIG. 10 shows a data processing system 1000 including an operand store in the form of a register file 1002. The register file 1002 provides input operands to a normal RISC execution unit 1004 as well as to an accelerator unit 1006. Result operands from the execution unit 1004 and the accelerator unit 1006 are written back into the register file 1002. The data processing system 1000 operates under control of a program stored within a program memory 1008. This program includes computational subgraphs (e.g. the instructions a, c, d and e) which may be subject to accelerated execution by the acceleration unit 1006. The acceleration unit 1006 is configurable under control of applied configuration data such that a wide variety of different forms of computational subgraph may be accelerated depending upon the applied configuration.

The normal execution unit 1004 in this example has two read ports from the register file 1002 and one write port to the register file 1002. In contrast, the accelerator unit 1006, which is typically performing more complex operations than the normal execution unit 1004, requires more input operands and output operands. Thus, the register file 1002 is provided with four read ports and two write ports. This has been found to match many real life computational subgraphs which are desired to be subject to acceleration by an acceleration unit 1006 as illustrated. The additional read and write ports for the register file 1002 impose additional circuit overhead, but this is adequately compensated by the increased execution speed of the acceleration unit 1006.

The program within the program memory 1008 still contains the individual separate program instructions capable of execution by the execution unit 1004 which together form the computational subgraph which is to be subject to acceleration by the acceleration unit 1006. Thus, the program stored within the program memory 1008 is capable of execution upon a system which does not include the acceleration unit 1006.

FIGS. 11A to 11F illustrate different forms of subgraph suggestion data which may be added to or associated with the program to identify computational subgraphs which may be subject to acceleration by the acceleration unit 1006.

Figures 11A, 11B:
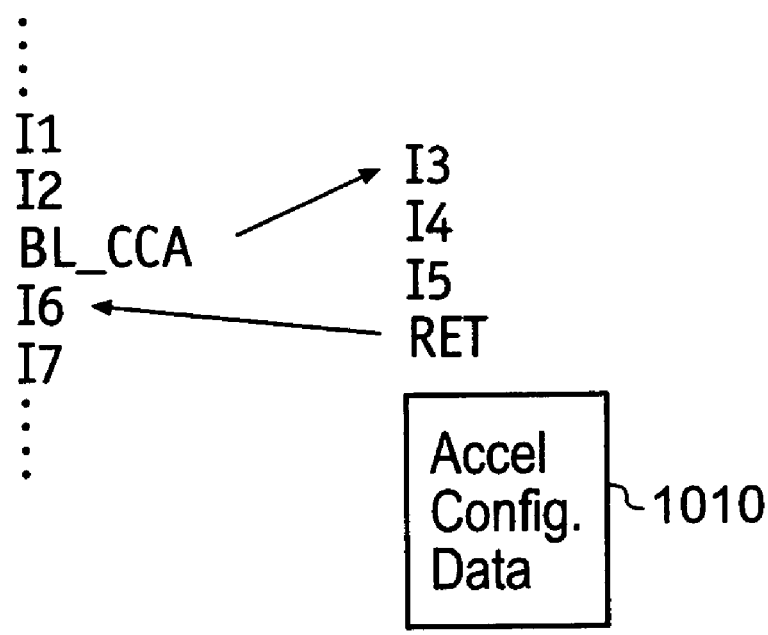
FIGS. 11A to 11F schematically illustrate different example forms of subgraph suggestion data.

In FIG. 11A the computational subgraph to be accelerated is instructions I3, I4 and I5. This computational subgraph is delimited by a CCA_Start instruction and a CCA_Stop instruction. These instructions can be added to the instruction set of the data processing system 1000. These instructions can be ignored by systems which do not include an accelerator unit 1006 and instead the normal instructions I3, I4 and I5 will be executed by the execution unit 1004. However, if an acceleration unit 1006 is present, then the CCA_Start instruction and the CCA_Stop instruction are used to identify a computational subgraph of instructions which can be accelerated by the acceleration unit 1006. In this circumstance for this example, the normal execution unit 1004 will not execute the instructions I3, I4 and I5, but instead the configurable accelerator 1006 will perform an accelerated execution of these instructions. (As an alternative the subgraph when first encountered may not be accelerated as suitable configuration data for the accelerator does not at that stage exist.) This accelerated execution may take a single computational cycle or multiple computational cycles but will typically be more rapid than the separate individual execution of the different instructions that form the computational subgraph. The CCA_Start instruction is a sequence start marker instruction and the CCA_Stop instruction is a sequence end marker instruction.

FIG. 11B illustrates an alternative form of subgraph suggestion data. In this example the same computational subgraph I3, I4 and I5 is outlined into a subroutine terminated by a return instruction RET. This subroutine is branched to using a subgraph branch instruction BL_CCA which indicates a branch to a sequence of instructions which are a computational subgraph that can be subject to an acceleration by an acceleration unit 1006, if such an acceleration unit 1006 is present. The subgraph branch instruction illustrated may be a branch and link instruction in which the return address is automatically saved as part of the branch, but alternatively different forms of instructions which trigger non-sequential program flow may also be used with such outlined subroutines corresponding to computational subgraphs. In the example of FIG. 11B accelerator unit configuration data 1010 is appended to the end of the computational subgraph subroutine. This is one example of how the accelerator unit configuration data may be associated with or embedded within the computer program to which it relates.

Figures 11C, 11D:
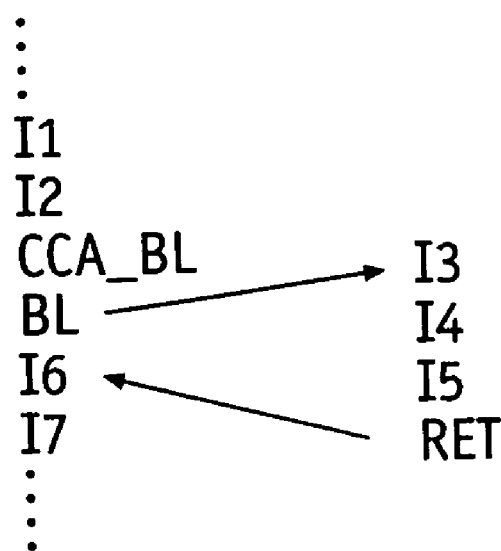

FIG. 11C illustrates an example of a branch marker instruction being used as subgraph identifying data. FIG. 11C illustrates a standard branch and link instruction BL which is predicated with a branch marker instruction CCA_BL. This branch marker instruction indicates to the system that the following branch instructions is to a subroutine which corresponds to a computational subgraph which may be accelerated by an acceleration unit 1006 if this is present. The CCA_BL instruction can be ignored by an embodiment which does not include an appropriate accelerator unit 1006. If an exception/interrupt occurs between the CCA_BL and the BL, then various options exist. The CCA_BL hint could be discarded and the subgraph executed without acceleration upon return. The CCA_BL and BL could be fused in execution such that exceptions cannot occur between them or the return could be fixed to return to a BL_CAA rather than a BC. In a similar way, the subgraph branch instruction BL_CCA of FIG. 11B can be interpreted as a standard form of branch and link instruction if the accelerator unit 1006 is not present.

FIG. 11D indicates a sequence marker instruction CCA_len#3 embedded within the program indicating the start of a computational subgraph and the length of that subgraph. In this example, the computational subgraph is the same three separate individual program instructions I3, I4 and I5. The sequence marker instruction immediately precedes this sequence of separate instructions and specifies that their length is three instructions.

Figures 11E, 11F:
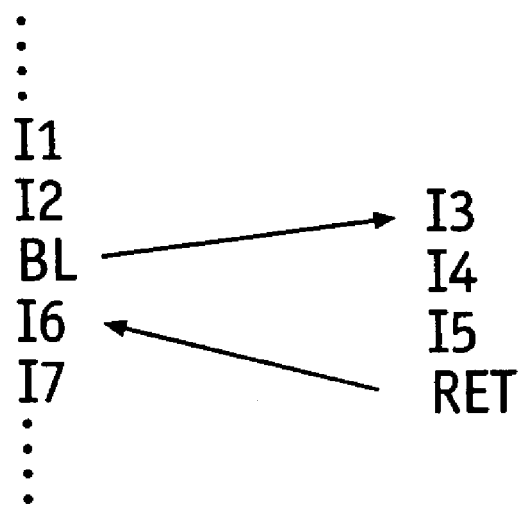

FIG. 11E illustrates another type of operation. In this embodiment a compiler which forms the program to be executed outlines (i.e. rearranges the code as to form suitable subroutines corresponding to the subgraph) computational subgraphs capable of execution within embodiments having an accelerator unit 106 into short subroutines. These subroutines are below a predetermined length and the system makes an assumption that such short subroutines are capable of acceleration by an accelerator unit 1006 if they are encountered (e.g. use of implicit markers). Whilst this assumption might not be universally correct, the system can revert to the normal execution of the individual programs if it turns out that the accelerator is not capable of accelerating that computational subgraph. Some time may be wasted in attempting such an acceleration and it failing, but overall the system can gain performance by use of this technique. The compiler can be arranged to compile code so as to avoid short subroutines unless they are computational subgraphs capable of acceleration by the optionally present accelerator unit 1006. Another possibility is that all subroutine calls of whatever length may be assumed to be capable of acceleration with normal execution being reverted to if acceleration is not in fact supported for a particular subroutine.

If the system does not explicitly mark subgraphs, then indicating which are the liveout registers becomes more difficult as there is no instruction operand in which to do so. With a CCA_start instruction, one of the operands can specify the internal liveout register (as the last destination was assumed liveout). However, with an implicit marker, there is not opportunity to name an internal liveout. One solution is to assume that the accelerator supports k liveouts then the destinations of the last k instructions may be assumed liveout; identification is then straight forward. The compiler can reorder the subgraph instructions to put the liveout producing instructions in the last k positions of the order, while still maintaining correct sequential semantics. Two subcases result, either this can be done without violating correctness by simple code reordering or it cannot. If it can, the compiler can proceed in this way and the problem is solved. If it cannot, then an additional, "useless" move can be inserted into the outlined body of the form liveout=liveout. This instruction will not do anything, but it will serve to mark the register as liveout as it will appear in the last k instructions of the sequence.

FIG. 11F illustrates another example of subgraph identifying data. In this example the computational subgraph is compiled into a characteristic form of instructions I3', I4' and I5'. These are chosen to be atypical forms of the instructions concerned and can be pattern matched by the hardware to identify computational subgraphs for acceleration by an acceleration unit 1006 when present. These pattern matched forms thus serve as the hint data. The compiler can be controlled to avoid generating such characteristic instructions when they do not correspond to a computational subgraph which may be subject to acceleration.

Figure 12A:
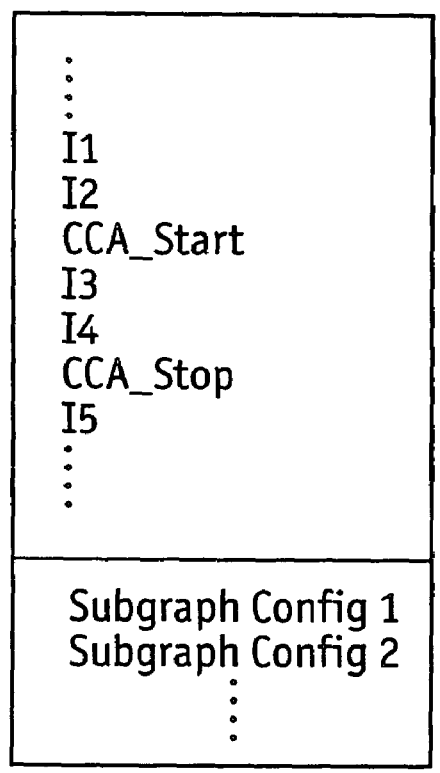
FIGS. 12A and 12B schematically illustrate the addition of accelerator configuration data to a program.

FIG. 12A illustrates a first example of associating accelerator configuration data with a program. In this example the subgraph configuration data is appended to the main program. This subgraph configuration data can be read from this point into a special purpose configuration data memory on system initialisation/boot or at another time. The appended configuration data can be considered as a table of configurations that are applied to a general purpose accelerator unit 1006 to configure it to accelerate predetermined computational subgraphs.

Figure 12B:
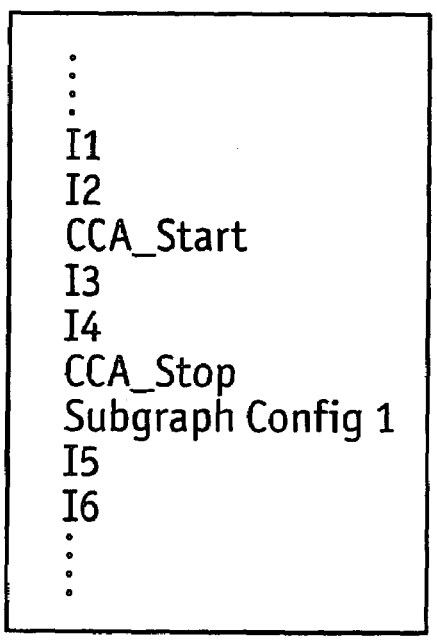

FIG. 12B illustrates another example of the way in which configuration data may be combined with the computer program. In this example the subgraph configuration data is embedded within the program itself following a particular computational subgraph to which it relates. On a legacy system which did not include an accelerator unit 1006, the CCA_Stop instruction would need to be supported to the extent that the sequence of data corresponding to the configuration data following that subgraph suggestion instruction was skipped rather than any attempt made to execute what was in fact configuration data rather than program code. Such behaviour can be provided by an appropriate undefined exception handler rather than requiring hardware modification on a legacy system.

Figure 13:
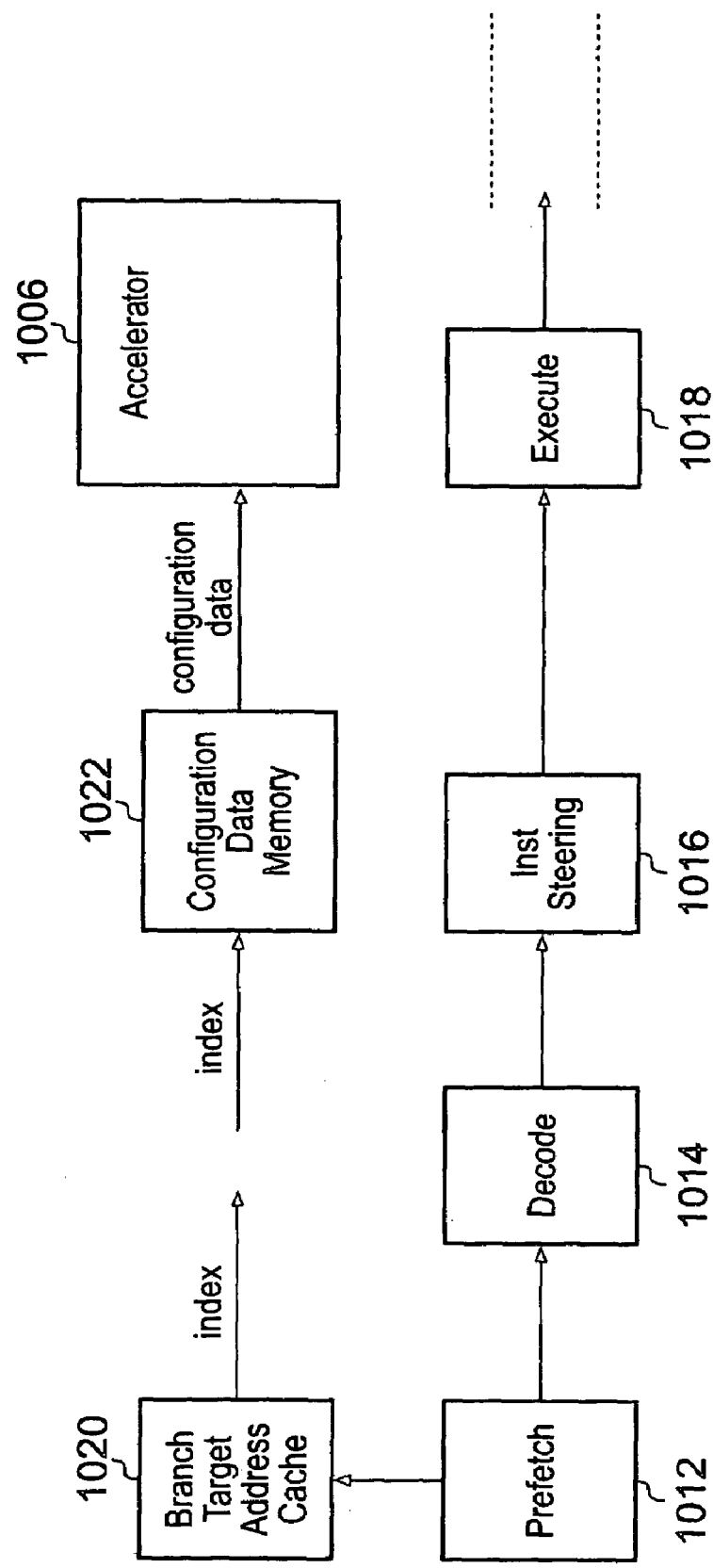
FIG. 13 schematically illustrates an instruction pipeline including a branch target address cache which is operable to setup the configuration of an accelerator unit.

FIG. 13 illustrates an instruction pipeline modified to support subgraph acceleration with a configurable acceleration unit 1006. A portion of the standard pipeline including a prefetch unit 1012, a decode unit 1014, an instruction steering unit 1016 and an execute unit 1018 is illustrated. It will be appreciated that further pipeline stages may also be provided and that some of these functional stages may be split depending upon the design parameters chosen.

Alongside the prefetch unit 1012, there is provided a branch target address cache 1020. As is known within the field, branch target address caches 1020 serve to cache the target addresses associated with previously encountered branch instructions such that the prefetch unit 1012 can when required start to prefetch from the branch target working upon a prediction as to whether or not that branch will or will not be taken. Such branch target address caches 1020 can be modified to help support the configurable acceleration unit 1006 previously discussed. In particular, the special forms of branch instruction as previously discussed or the sequence start/end marker instructions previously discussed may be identified by the branch target address cache 1020 and have associated with them an index value used to index into a table of configuration data stored within a configuration data memory 1022. Alternatively, the raw configuration data may be stored within the branch target address cache itself (typical configuration data may be of the order of 256 bits or similar). Thus, when a computational subgraph is identified by the subgraph hint information embedded within the program, its configuration data can be directly or indirectly identified and passed along the pipeline until the execute stage is reached. At that stage, the instruction steering unit can steer the computational subgraph either to be executed as a combined or otherwise accelerated, operation by the accelerator unit 1006 or to be executed by the normal execution unit 1004.

FIGS. 14A and 14b together schematically illustrate a configurable accelerator unit 1006. As illustrated in this example, there are four input operands received. A single output operand emerges from the last stage within the accelerator 1006, but alternative or additional output operands (subject in this example to a maximum of two output operands) may also be tapped off from various points along the accelerator 1006. As illustrated, each stage within the accelerator is preceded by a row of multiplexers. These multiplexers each select from among the total possible number of inputs to that accelerator stage either one or two inputs to be provided to an associated primitive operating unit. Interconnect configuration data icd configures these multiplexers to make the connections required by the particular computational subgraph being accelerated.

The primitive operator units in this example have two Forms namely Form A and Form B. Form A is capable of performing arithmetic operations, such as addition and subtraction, as well as logical operations such as ANDs, Ors, shifts, bit extractions and the like. The primitive operator unit of Form B is able to perform the logical operations but not the arithmetic operations of addition and subtraction. The hardware saving of not having to provide adder support at each stage within the accelerator unit 1006 is considerable and yet many real life computational subgraphs may still be mapped onto the accelerator unit 1006. The individual primitive operator units are configured to perform the desired computational manipulation using primitive configuration data pcd applied thereto. Thus, it will be seen that a combination of the interconnect configuration data icd and the primitive configuration data pcd together configure the accelerator unit 1006 to perform a particular desired computational subgraph.

It will be appreciated that in the action of the accelerator unit 1006 the primitive operator units are each capable of producing an intermediate result value. These intermediate result values are then passed onto further primitive operator units via the interconnect units (multiplexers). These intermediate result values whilst they may correspond to register values within the computational subgraph being accelerated do not in practice need to be written to or read from such registers. Thus, finite register resources both in terms of register space and access ports to the register file need not be consumed by the accelerator unit 1006 for such intermediate result values. This can also save energy and forwarding logic requirements for such unimportant intermediate results. This extends the capability of the accelerator unit 1006 whilst still allowing it to be tightly coupled to the existing operand store (register file 1002) and normal execution unit 1004.

Figure 15:
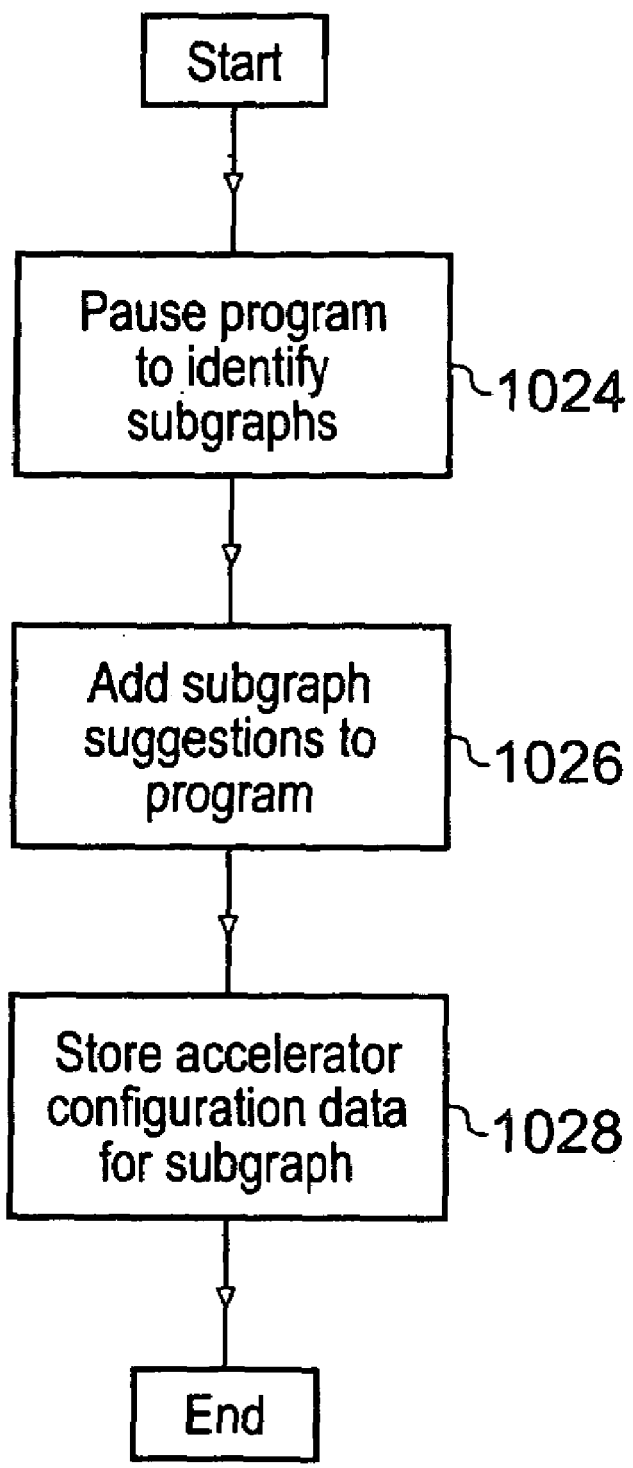
FIG. 15 is a flow diagram schematically illustrating the addition of subgraph suggestion data to a program.

FIG. 15 is a flow diagram schematically illustrating the addition of subgraph identification data to the program. This method may be performed by a software compiler as part of its compilation operation. Compilers typically already identify computational subgraphs within the programmer code they are compiling to efficiently map this onto the target processor native code. This computational subgraph identification can be extended to trigger the addition of subgraph identification data to the program code with that subgraph identification data being used by optionally present configurable accelerator units 1006 to delimit acceleratable subgraphs. Alternatively, such subgraph identification may be performed by a program thread executing upon the target processor itself and analysing its own code or in some circumstances by dedicated hardware operating on the target processor.

At step 1024, the program is parsed to identify computational subgraphs capable of acceleration. At step 1026 the subgraph suggestion data is added to the program. At step 1028 the accelerator configuration data (icd and pcd) is added to the program. This accelerator configuration data targets the computational subgraphs which have been identified by the parsing process and enables the general purpose accelerator unit 1006 to be configured to particular computational subgraphs.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of a program having program instructions and subgraph suggestion information identifying respective sequences of program instructions corresponding to computational subgraphs identified within said program, said apparatus comprising:
a memory operable to store a program formed of separate program instructions;
processing logic operable to execute respective separate program instructions from said program; and
accelerator logic operable in response to reaching an execution point within said program associated with a subgraph suggestion to execute a sequence of program instructions corresponding to said subgraph suggestion as an accelerated operation instead of executing said sequence of program instructions as respective separate program instructions with said processing logic, wherein said apparatus stores accelerator configuration data operable to configure said accelerator logic to adopt one or more configurations to execute as accelerated operations one or more sequences of program instructions corresponding to computational subgraphs identified within said program, wherein said accelerator configuration data is stored in a configuration data memory, wherein said configuration memory is indexed with a value held within a branch prediction unit.

2. Apparatus as claimed in claim 1, wherein said accelerator logic is operable in response to reaching an execution point within said program associated with a subgraph suggestion corresponding to a sequence of program instructions not able to be executed as an accelerated operation by said accelerator logic to ignore said subgraph suggestion and allow said sequence of program instructions to be executed as respective separate program instructions with said processing logic.

3. Apparatus as claimed in claim 1, wherein said subgraph suggestion information comprises marker instructions embedded within said program.

4. Apparatus as claimed in claim 3, wherein a sequence start marker instruction is embedded within said program preceding an associated sequence of program instructions corresponding to a computational subgraph identified within said program.

5. Apparatus as claimed in claim 3, wherein a sequence end marker instruction is embedded within said program succeeding an associated sequence of program instructions corresponding to a computational subgraph identified within said program.

6. Apparatus as claimed in claim 3, wherein a sequence marker instruction is embedded within said program and indicates a location and length of an associated sequence of program instructions corresponding to a computational subgraph identified within said program.

7. Apparatus as claimed in claim 3, wherein a branch marker instruction is embedded within said program and identifies a branch instruction to an associated sequence of program instructions as corresponding to a computational subgraph identified within said program.

8. Apparatus as claimed in claim 1, wherein said subgraph information comprises subgraph branch instructions specifying a branch to an associated sequence of program instructions as corresponding to a computational subgraph identified within said program.

9. Apparatus as claimed in claim 1, wherein said accelerator configuration data is stored as part of said program.

10. Apparatus as claimed in claim 1, wherein said configuration data memory is part of a branch prediction unit.

11. Apparatus as claimed in claim 1, wherein said subgraph suggestion information comprises branch instructions indicating a branch to a sequence of program instructions of a length below a maximum length capable of being executed as a combined operation and said accelerator logic operable to detect if a sequence of program instructions indicated by a branch instruction is one which said accelerator logic is capable of executing as an accelerated operation.

12. Apparatus as claimed in claim 1, wherein said subgraph suggestion information comprises a sequence of program instructions having a predetermined form operable to trigger pattern matching logic within said accelerator logic.

13. Apparatus as claimed in claim 1, wherein said subgraph suggestion information comprises a table of data identifying said sequences of program instructions corresponding to computational subgraphs.

14. Apparatus as claimed in claim 1, wherein said subgraph suggestion information is added:
(i) prior to execution;
(ii) at runtime by software; and
(iii) at runtime by hardware.

15. A method of processing data under control of a program having program instructions and one or more subgraph markers identifying respective sequences of program instructions corresponding to computational subgraphs identified within said program, said method comprising:
storing a program formed of separate program instructions within a memory;
executing respective separate program instructions from said program with processing logic;
in response to reaching an execution point within said program associated with a subgraph marker executing a sequence of program instructions corresponding to said subgraph marker as a combined operation with accelerator logic instead of executing said sequence of program instructions as respective separate program instructions with said processing logic; and
storing accelerator configuration data operable to configure said accelerator logic to adopt one or more configurations to execute as accelerated operations one or more sequences of program instructions corresponding to computational subgraphs identified within said program, wherein said accelerator configuration data is stored in a configuration data memory, wherein said configuration memory is indexed with a value held within a branch prediction unit.

16. A computer program product comprising a computer readable storage medium containing computer readable program instructions and one or more subgraph markers identifying respective sequences of program instructions corresponding to computational subgraphs identified within said program, said computer program being operable to control an apparatus for processing data to perform the method as claimed in claim 15.

17. Apparatus for processing data under control of a program having program instructions and subgraph suggestion information identifying respective sequences of program instructions corresponding to computational subgraphs identified within said program, said apparatus comprising:
a memory operable to store a program formed of separate program instructions;
processing logic operable to execute respective separate program instructions from said program; and
accelerator logic operable in response to reaching an execution point within said program associated with a subgraph suggestion to execute a sequence of program instructions corresponding to said subgraph suggestion as an accelerated operation instead of executing said sequence of program instructions as respective separate program instructions with said processing logic,
wherein said subgraph suggestion information comprises marker instructions embedded within said program, wherein a sequence marker instruction is embedded within said program and indicates a location and length of an associated sequence of program instructions corresponding to a computational subgraph identified within said program.

18. Apparatus for processing data under control of a program having program instructions and subgraph suggestion information identifying respective sequences of program instructions corresponding to computational subgraphs identified within said program, said apparatus comprising:
a memory operable to store a program formed of separate program instructions;
processing logic operable to execute respective separate program instructions from said program; and
accelerator logic operable in response to reaching an execution point within said program associated with a subgraph suggestion to execute a sequence of program instructions corresponding to said subgraph suggestion as an accelerated operation instead of executing said sequence of program instructions as respective separate program instructions with said processing logic,
wherein said apparatus stores accelerator configuration data operable to configure said accelerator logic to adopt one or more configurations to execute as accelerated operations one or more sequences of program instructions corresponding to computational subgraphs identified within said program, wherein said accelerator configuration data is stored in a configuration data memory, wherein said configuration data memory is part of a branch prediction unit.

19. A method of processing data under control of a program having program instructions and one or more subgraph markers identifying respective sequences of program instructions corresponding to computational subgraphs identified within said program, said method comprising:
storing a program formed of separate program instructions within a memory;
executing respective separate program instructions from said program with processing logic; and
in response to reaching an execution point within said program associated with a subgraph marker executing a sequence of program instructions corresponding to said subgraph marker as a combined operation with accelerator logic instead of executing said sequence of program instructions as respective separate program instructions with said processing logic, wherein said subgraph suggestion information comprises marker instructions embedded within said program, wherein a sequence marker instruction is embedded within said program and indicates a location and length of an associated sequence of program instructions corresponding to a computational subgraph identified within said program.

20. A method of processing data under control of a program having program instructions and one or more subgraph markers identifying respective sequences of program instructions corresponding to computational subgraphs identified within said program, said method comprising:

storing a program formed of separate program instructions within a memory;

executing respective separate program instructions from said program with processing logic; and in response to reaching an execution point within said program associated with a subgraph marker executing a sequence of program instructions corresponding to said subgraph marker as a combined operation with accelerator logic instead of executing said sequence of program instructions as respective separate program instructions with said processing logic, wherein said apparatus stores accelerator configuration data operable to configure said accelerator logic to adopt one or more configurations to execute as accelerated operations one or more sequences of program instructions corresponding to computational subgraphs identified within said program, wherein said accelerator configuration data is stored in a configuration data memory, wherein said configuration data memory is part of a branch prediction unit.

* * * * *